United States Patent [19]
Hirzel

[11] Patent Number: 6,015,518
[45] Date of Patent: Jan. 18, 2000

[54] METHOD OF MAKING A DEVICE FOR CONDUCTING A FLUID BETWEEN A SPACE BOUNDED BY A FIXED SURFACE AND A DUCT

[75] Inventor: Theodor Hirzel, Widen, Switzerland

[73] Assignee: Unipor AG, Winterthur, Switzerland

[21] Appl. No.: 08/836,439

[22] PCT Filed: Oct. 27, 1995

[86] PCT No.: PCT/CH95/00250

§ 371 Date: Jul. 15, 1997

§ 102(e) Date: Jul. 15, 1997

[87] PCT Pub. No.: WO96/14194

PCT Pub. Date: May 17, 1996

[30] Foreign Application Priority Data

Nov. 2, 1994 [CH] Switzerland .............................. 3269/94
Nov. 2, 1994 [CH] Switzerland .............................. 3270/94

[51] Int. Cl.[7] .............................. B29C 43/04; B29C 43/20
[52] U.S. Cl. .............................. 264/69; 264/101; 264/113; 264/120; 264/122; 264/571
[58] Field of Search .................................. 249/113, 141; 264/122, 69, 101, 571, 120

[56] References Cited

U.S. PATENT DOCUMENTS

| | | | |
|---|---|---|---|
| 3,001,582 | 9/1961 | Kindseth et al. | 249/113 |
| 3,353,219 | 11/1967 | Snyder | 249/113 |
| 4,830,802 | 5/1989 | Ito et al. | 249/141 |
| 5,190,094 | 3/1993 | Knoess | 264/122 |
| 5,431,784 | 7/1995 | Miyamoto et al. | 249/113 |
| 5,567,373 | 10/1996 | Sato et al. | |

FOREIGN PATENT DOCUMENTS

| | | |
|---|---|---|
| 0 440 874 | 8/1991 | European Pat. Off. |
| 1 504 261 | 9/1969 | Germany |
| 41 31 298 | 5/1992 | Germany |
| 42 25 412 | 4/1993 | Germany |

OTHER PUBLICATIONS

Hiraoki Takahashi, Casting Mold and Manufacture Thereof, Patent Abstracts of Japan vol. 14, No. 10 (M917) Jan. 10, 1990, Appl. No. 63–85589 of Apr. 1988, Inax Corp.) 1 page.

*Primary Examiner*—Allan R. Kuhns
*Attorney, Agent, or Firm*—Walter C. Farley

[57] ABSTRACT

The device according to the invention is used for conducting a fluid between a space at least partly bounded by a solid surface through which a fluid can flow and a duct, a high surface continuity of the fluid flow through the surface being achieved with a relatively small differential pressure. The device comprises a coarsely porous shaped part (3), which has on the surface areas through which a flow is to take place a finely porous surface layer (4). The pores of the surface layer (4) are open at the surface and progress continuously into the shaped part (3). The shaped part (3) and surface layer (4) together form a one-piece part of a cured plastic, in that in the vicinity of the shaped part are incorporated larger particles and in the vicinity of the surface layer (4) smaller particles, e.g. aluminium particles, in such a way that the particles represent a larger proportion of the weight than the plastic. A fluid-impermeable closing layer (5), to which is applied a duct connection opening (2), covering the remaining surface of the shaped part (3) can form part of the same plastic body, no particles being incorporated into said part.

5 Claims, 5 Drawing Sheets

METHOD OF MAKING A DEVICE FOR CONDUCTING A FLUID BETWEEN A SPACE BOUNDED BY A FIXED SURFACE AND A DUCT

FIELD OF THE INVENTION

The invention is in the field of conducting moving fluids and relates to a device and a method for the manufacture of the device. The device is used for conducting fluids between a space, which is at least partly bounded by a fixed surface through which the fluid is to pass, and a duct, through which the fluid is supplied or removed.

BACKGROUND OF THE INVENTION

Fluids are transported for the most varied purposes by means of pumps or similar fluid delivery means in channel, sewer or duct systems. A plurality of such fluid conducting systems with fluid delivery means serve to bring a fluid for a specific action into a space or a room, or remove it therefrom, the fluid being conveyed between the space and the duct by openings in the surface bounding the space or through an open duct end.

Examples of such fluid conducting systems are systems for evacuating spaces, systems for gassing or gas infection of spaces, systems for heating or cooling spaces by transporting fluid heat carriers through the spaces or systems for removing solids or other fluids from spaces by utilizing the kinetic energy of the fluids supplied to the spaces. In many of these applications it would be desirable for the most varied reasons to be able to transport the fluid as a continuum through the surface bounding the space, in such a way that all points of said surface would be identical with respect to the fluid passage. In the prior art this wish is approximately fulfilled by providing a large number of duct ends opening into the space providing larger duct ends closed with a porous wall and between the duct ends and porous wall a distributing space is provided. The finer the pores of such porous walls, the higher the pressure gradient necessary in order to deliver the fluid through the wall, which in turn increases the demands concerning the mechanical stability of the wall. Therefore, for each application a procedurally economic optimum must be sought between a surface continuity of the fluid delivery over the complete surface through which the flow is to take place still satisfying the requirement and a still acceptable level of the necessary pressure difference.

SUMMARY OF THE INVENTION

An object of the invention is to provide a device making it possible to shift the aforementioned optimum towards a better fluid continuity over the surface through which the fluid is to flow, without having to accept increased effort and expenditure on the pressure difference size. Thus, in other words, an object of the invention is to provide a device for conducting a fluid between a space bounded by a surface and a duct, the continuity of the fluid flow through the entire surface being very good, the expenditure and effort necessary for delivering the fluid does not exceed or is even lower than in known means of this type. In addition, a method is to be given for the manufacture of the device according to the invention.

The device according to the invention comprises a coarsely porous shaped part, whose surface, at the point where the fluid flows through it, carries a finely porous surface layer and on the other surface areas fluid-impermeable closing means, which are interrupted by at least one duct connection opening. At least the coarsely porous shaped part and the finely porous surface layer are in the form of a plastic body through which passes a three-dimensional network of pores, which pass in finer, but continuous manner from the shaped part into the surface layer and to the outer surface thereof. The fluid-impermeable closing means can be constructed as pore-free closing layer for the same plastic body or can be a separate part linked by suitable means with the plastic body.

The coarsely porous shaped part, the finely porous surface layer and optionally the pore-free closing layer advantageously are made from the same cured plastic, in which are incorporated in the vicinity of the surface layer smaller particles, in the vicinity of the shaped part larger particles and in the vicinity of the closing layer no particles.

The weight proportion of the particles in the surface layer and in the shaped part is higher than the weight proportion of the plastic and in the surface layer it is generally lower than in the shaped part.

For the manufacture of the device various mixtures of particles and as yet uncured plastic are produced, said mixtures being superimposed in suitable molds, compacted (optionally individually) and cured together.

A material particularly suitable for the manufacture of the device according to the invention is described in EP-486421. The material comprises a cured plastic, e.g. an epoxy-based plastic, in which are incorporated particles with a preferably irregular shape in such a way that the material has a continuous porosity in all directions. The particles are preferably of aluminum or an aluminum alloy, but can also be of another metal or a ceramic material.

The material can be produced in a two-stage process, in that initially the particles are kneaded with a part of the as yet uncured plastic or with corresponding components of the plastic, e.g. with part of the resin component (without hardener). This leads to a pourable or coatable mixture, in which the particles appear in cluster fore, of e.g. five to twenty particles, the cluster size being dependent on the plastic/particle mixing ratio, the particle size, the kneading time and the kneading intensity. The cluster mixture constitutes a storable intermediate, in which the porosity of a member to be produced therefrom is at least partly predetermined. In a second stage the cluster mixture is added to the remainder of the plastic or the remainder of the plastic components (e.g. hardener), mixed, filled into a mold, compressed by pressing or vibratin, and cured, the porosity of the finished product being in particular determined by the compression or compaction.

The material can also be produced with a single mixing/kneading stage, a mixture of particles with the entire quantity to be processed or all components of the plastic being produced by mixing and kneading, molding, compacting and curing. The porosity of the finished material is then in particular determined by the particle size, its weight proportion in the particle/plastic mixture and the nature and intensity of mixing and compacting.

The characteristic property of this material (according to EP-486421) is its open porosity adjustable by the choice of components and the production method. The pores pass as fine and ultrafine channels through the material in all directions and in a uniform manner and as a result of the non-uniform shape of the particles form on the material surfaces at least partly openings narrowing towards the outside.

The porosity of the material is adjustable particularly through the particle size and the mixing ratio of the particles and plastic, but also by the nature and duration of the mixing process and the nature of the compaction (vibration, compacting pressure) before and/or during plastic curing.

It has been found that when using aluminum granules with screen fractions of 50 to 200 um mixed with an epoxy resin and a suitable hardener in a ratio of approximately 1:0.1 (weight of granules:weight of plastic components) to approximately 1:0.5, more particularly with a ratio of approximately 1:0.15, a mixture is obtained which is suitable for the finely porous surface layer. In particular, said material forms a surface, which has a porosity suitable for a high surface continuity of the fluid flow through the surface and which without any reworking satisfies the highest demands for the contact with e.g. a plastic to be processed. However, it is also possible to rework the surface.

The coarsely porous shaped part contains Larger particles, e.g. screen fractions of 0.5 to 1.25 mm, and the same plastic as the surface layer material. Compared with the mixture for the surface layer generally a greater granule weight and smaller plastic weight is used, e.g. a granules to plastic mixing ratio between approximately 1:0.05 and 1:0.1, particularly approximately 1:0.07.

The continuous progression of the pores from the finely porous surface layer to the coarsely porous shaped part is achieved in that both granule/plastic mixtures are brought onto one another and pressed together in the as yet uncured state of the plastic and in that both mixtures are cured together in this state.

BRIEF DESCRIPTION OF THE DRAWINGS

Examples of the device according to the invention for different applications are described in greater detail in conjunction with the attached drawings, wherein.

DESCRIPTION OF PREFERRED EMBODIMENTS

Figure 1:
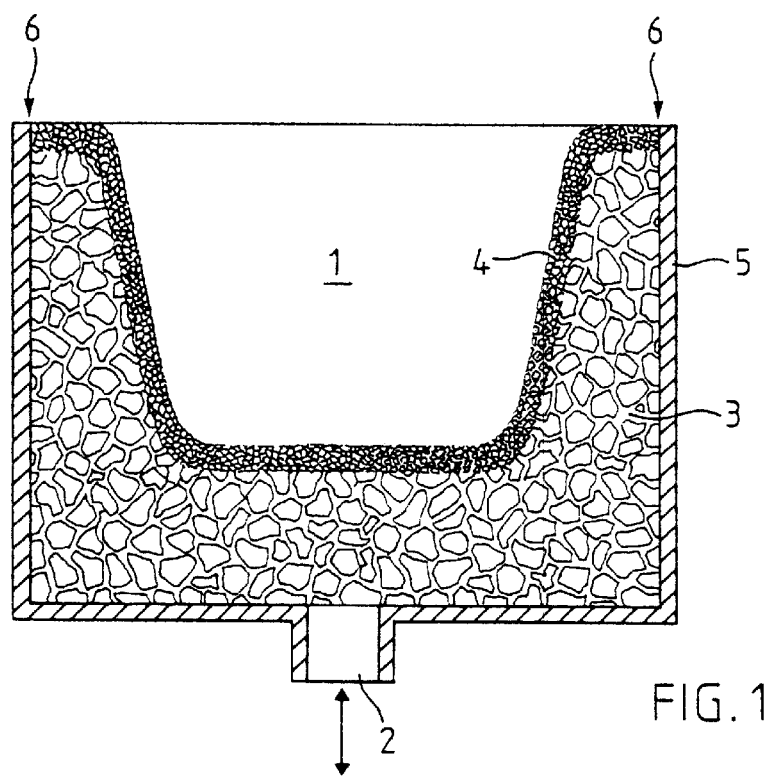
FIG. 1 is a section through an embodiment of the inventive device usable as a mold for deep drawing or as a mold for the manufacture of articles from ceramic material.

FIG. 1 shows an embodiment of the device according to the invention. It is a mold, which can e.g. be used for deep drawing or for the manufacture of articles from a ceramic material.

The mold essentially comprises a coarsely porous shaped part 3, which has mechanical characteristics enabling it to assume the mechanical functions of the mold and which is uniformly traversed in all directions by a network of relatively coarse pores, so that a fluid medium can be conveyed without any significant resistance through said shaped part and for this reason is regularly distributed within said shaped part. On those surface areas of the shaped part through which the fluid is to flow, to the shaped part 3 is connected a finely porous surface layer 4, whose pores are open toward the mold surface and progress continuously in the pores of the shaped part.

The finely porous surface layer 4 e.g. has a thickness of approximately 5 to 10 mm. It is not necessary to have an overall precisely identically thick surface layer.

The surface areas of the shaped part through which the fluid does not have to flow, do not require a finely porous surface layer. These surfaces are closed with corresponding fluid-impermeable closing means 5 and at at least one point (duct connection opening 2) said shaped part is connected through said sealed surface via a not shown duct to fluid feed means (e.g. hydraulic accumulator, pump). The fluid-impermeable closing means 5 e.g. comprise a corresponding, open container, which has a duct connection opening 2 and optionally duct connection means in the form of a pipe connection or the like. All around the cup-shaped cavity 1 of the mold (points 6) are advantageously fitted corresponding seals. The container 5 is e.g. made from plastic or metal.

The closing means 5 can also be constructed as a closing layer and be shaped in one piece on the shaped part 3 from the same plastics material as said shaped part and the surface layer 4. The plastics material of such a closing layer contains no particles like the porous areas and is consequently fluid-impermeable. Such a closing layer can e.g. contain glass fibers for mechanical reinforcement reasons.

A mold, such as is shown in FIG. 1, is e.g. used for the deep drawing of cup-shaped parts from a plastic film. For deep drawing purposes a plastic film is positioned over the cup-shaped, open mold cavity 1 and through the duct connection opening 2 the air is sucked out of the cavity by means of a suction device. As a result of the vacuum occurring in the cavity 1, the film is drawn against the mold and correspondingly deformed and additionally use can be made of a countermold. For ejecting the finished, deep-drawn cup, compressed air is supplied through the duct connection opening 2.

A mold, such as is shown in FIG. 1, can be used together with a corresponding countermold for the manufacture of ceramic articles, the unbaked material being cast between the two molds, the countermold is removed, the article 3 predried and then ejected from the mold by the supply of compressed air. In this application a high surface continuity of the compressed air applied is very important, because the unbaked ceramic material is highly mechanically sensitive.

A device according to the invention for use e.g. in the deep drawing of plastic films or for the manufacture of ceramic articles can have several, juxtaposed, open cavities 1 for the simultaneous manufacture of several articles, as in known molds of this type. Obviously a corresponding countermold having a convex, porous surface layer can be constructed in the same way as for the device of FIG. 1.

Figure 2:
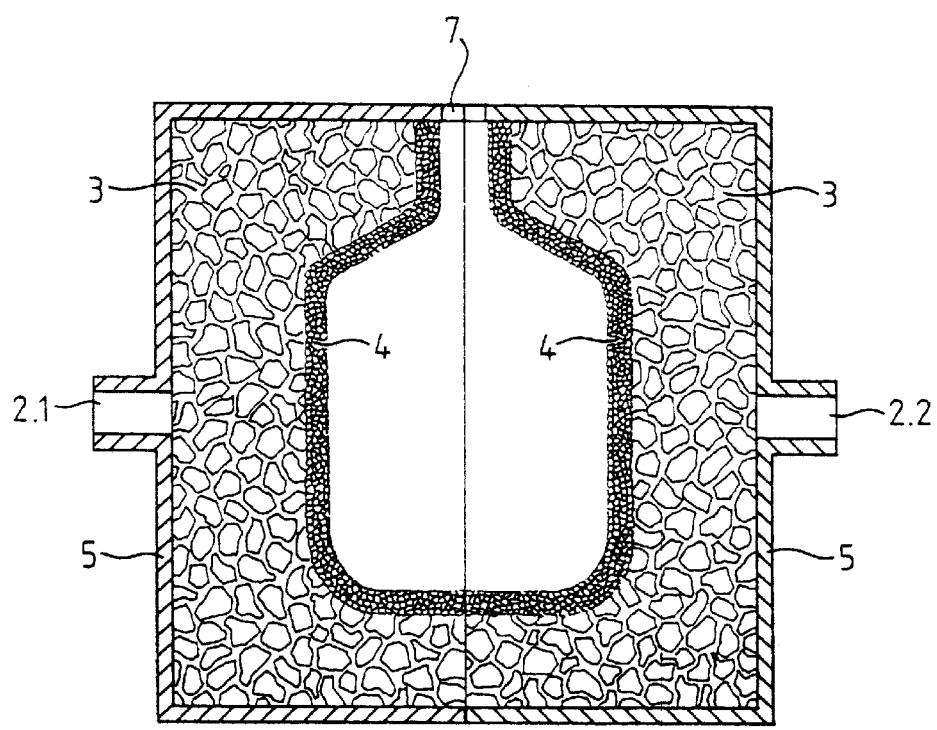
FIG. 2 is a section through an embodiment of the inventive device usable for a process for the reexpansion and welding of plastic granules.

FIG. 2 diagrammatically shows another embodiment of the device according to the invention. It is in fact a simple mold for the manufacture of a plastic granule part by reexpansion and welding the granules. Such manufacturing methods are in particular used in the manufacture of casting molds for lost-foam casting methods and for the manufacture of e.g. polystyrene granule packing aids. The construction of the mold is essentially the same as for the device described in conjunction with FIG. 1. Identical parts or areas are given the same reference numerals. The mold is in two or more parts and is closed with the exception of a sealable opening 7 for the supply of granules. Facing one another is provided in each case at least one duct connection opening 2.1 and 2.2 through which are passed in successively alternating direction through the mold a fluid medium, e.g. water vapor, as the energy carrier and the granules contained therein.

It has been found that in a mold, of the type diagrammatically shown in FIG. 2, due to the very regular distribution of the energy carrier over the entire mold, an extremely regular reexpansion and welding of the plastic granules can be achieved.

Molds, such as are shown in FIG. 2, can e.g. also be used for low pressure injection molding, the finished, cast and cooled article being ejected with compressed air supplied through the mold. Further applications are also conceivable for processes in which the fluid supplied through the mold has to bring about a chemical change to the cavity content. Due to its simple manufacture and low weight, such molds also lead to corresponding advantages for manufacturing processes operating without a fluid.

Figure 3:
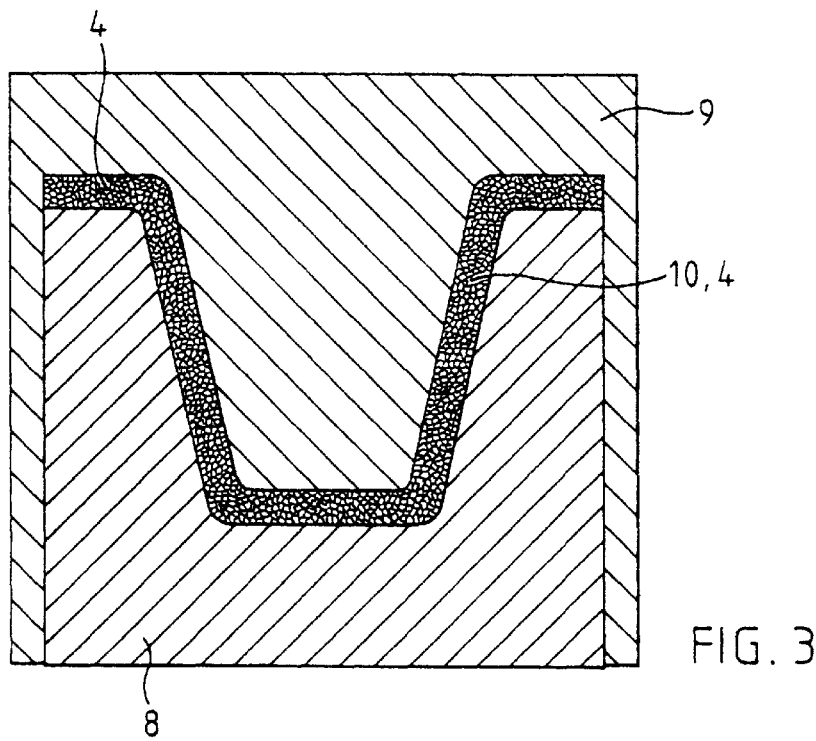
FIGS. 3 & 4 are sectional views showing two successive phases of the method for the manufacture of the embodiment of the inventive device according to FIG. 1.
Figure 4:
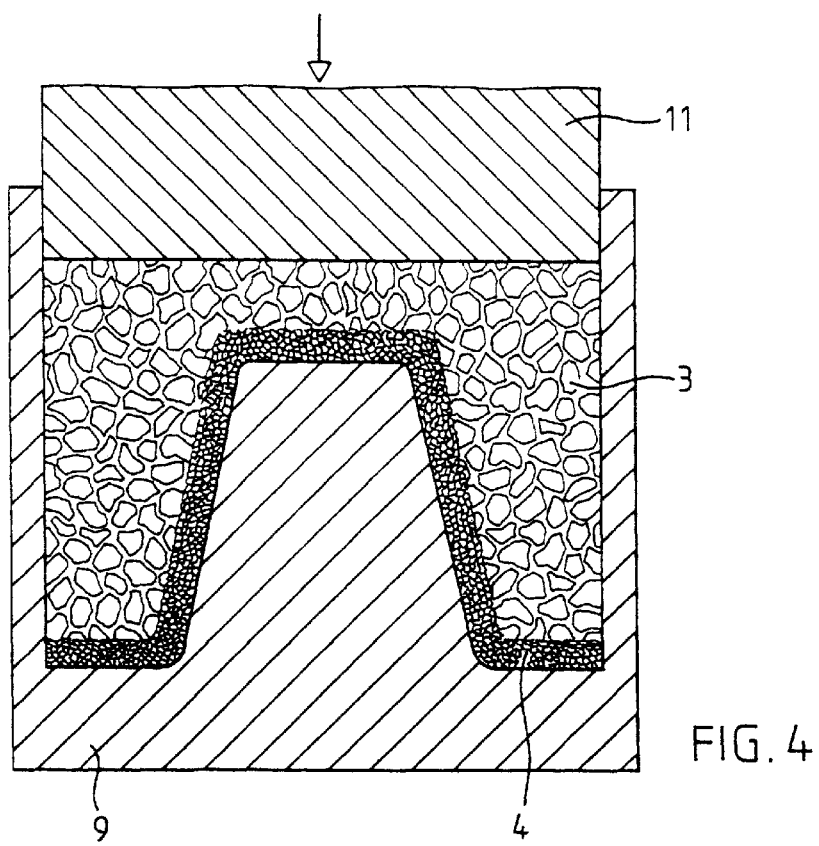

FIGS. 3 and 4 show in a very diagrammatic manner a method for the manufacture of the embodiment according to FIG. 1 of the inventive device. Molds according to FIG. 2 can be produced using the same method.

Between two mold parts 8 and 9 (FIG. 3), which together form a cavity 10, which corresponds to the surface layer 4 to be produced, is brought a first mixture of uncured plastic and e.g. aluminum granules. The surfaces of the mold parts coming into contact with the mixture are so prepared that the mixture does not adhere thereto. Between the mold parts the mixture is compacted by vibration and the action of a compacting pressure. The mold parts 8 and 9 are then rotated together and the mold part 8 removed.

The surface layer 4 can also be produced with only one mold part 8 or 9. On said mold part is then placed a corresponding layer of the first mixture and is tightly covered with a film. The surface layer space, i.e. that between the film and the mold is then evacuated, which also leads to a compressively acting compacting pressure. It has been found that e.g. a pressure reduced to approximately 0.8 to 0.6 bar leads to good compacting results.

FIG. 4 shows the second stage of the method for the manufacture of the inventive device i.e. the manufacture of the coarsely porous shaped part 3. For this purpose into the mold part 9 is filled a second mixture of aluminum granules and plastic and is compacted with the aid of a further mold part 11 by vibration and/or compacting pressure, the latter being no higher than the compacting pressure used for compacting the first mixture. Advantageously and under the further action of the compacting pressure, the plastic in the two mixtures is then cured.

The two following mixtures and corresponding method parameters are in particular suitable for the manufacture of molds for lost-foam molding processes through which steam at a temperature of approximately 100° C. is passed for the reexpansion and welding of the plastic granules.

First mixture for the finely porous surface layer 4:
plastic: epoxy resin and hardener,
incorporated particles: granules of an aluminum-silicon alloy (screen fraction 100 and 63 um, weight ratio: 332:83),
mixing ratio: particles to plastic 415:50,
mixing process, with mixing and kneading action: 15 min,
compaction: compacting pressure approx. 120 kp/cm$^2$, 5 to 10 sec.
Second mixture for the coarsely porous shaped part 3:
plastic: epoxy resin and hardener,
incorporated particles: aluminum granules (screen fraction 0.5 to 1.25 mm),
mixing ratio: particles to plastic 622:45,
mixing process: with mixing and kneading action, 5 min,
compaction; compacting pressure approx. 1 kp/cm$^2$, during curing.
Curing of the entire plastic body; 80°, 3 h.

Figure 5:
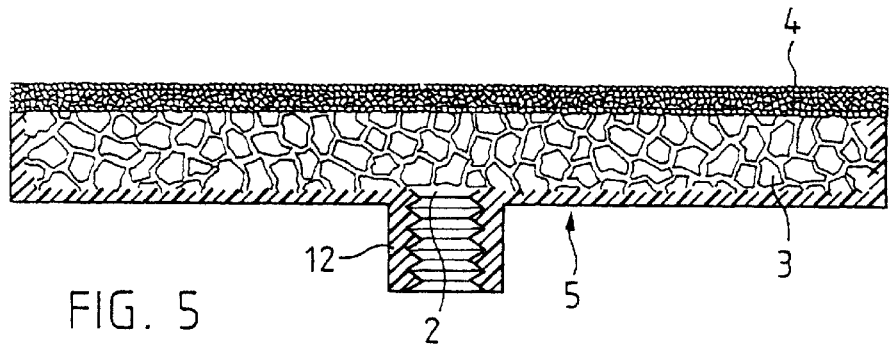
FIG. 5 is a cross-section through another embodiment of the inventive device usable as a gassing element.

FIG. 5 shows in cross-section as a further embodiment of the inventive device a gassing or gas injection element. The latter is in one piece and is essentially made from a plastic material, brought into solid form by a curing process, e.g. from a cured epoxy resin. The plastic body has a flat, coarsely porous shaped part 3, which is covered on one side by a finely porous surface layer 4 and on the other side, as well as on the narrow sides by a fluid-impermeable closing means 5 in the form of a closing layer with a duct connection opening 2, which is provided with duct connection means 12. The gassing element has no hollow cavity. Therefore it can be produced by a succession of simple method stages, namely molding, compacting and curing. The resulting gassing element requires no reworking. It can be directly screwed onto a pipe connection e.g. with a standard external thread. As a result of the one piece nature of the gassing element there is no need for special precautions to prevent an undesired gas exit at the element and they are only necessary at the connection point between the gassing element and the duct.

The gassing element is essentially made from the same material as the molds described in conjunction with FIGS. 1 and 2. As a result of the structure of the material used, the gas passing out through the finely porous surface of the gassing element is in small bubble form and despite the gas passage no significant resistance occurs, i.e. the overpressure necessary for gassing is small.

As the material porosity can be easily adjusted, gassing elements according to FIG. 5 can also be easily adapted to given use depths (different liquid pressures) and/or given gas pressures, the size of the resulting bubbles and the through-flowing gas quantity being kept substantially constant.

The surface openings of the ducts in such a material are so fine that it is scarcely possible for impurities to penetrate, so that even when used in clarification tanks the gassing elements do not have to be cleaned. The particles incorporated into the plastic matrix are surrounded and covered by the plastic, so that they are only exposed to a limited extent to a corroding action of the liquid and/or the gas, they can also be made from a corrosion-resistant material, such as e.g. ceramic materials or correspondingly alloyed metals (e.g. aluminum-silicon alloys).

Further exemplified embodiments of the inventive device as a gassing element can differ from that shown in FIG. 5 in that they e.g. have more than two different porous layers (shaped part 3 and surface layer 4), the porosity becoming finer with increasing distance from the closing layer 5 and in particular from the duct connection opening 2. Other embodiments can also be less flat and have a closing layer 5 restricted to the immediate vicinity of the duct connection opening.

FIGS. 6 to 10 show different, successive phases of a method variant for the manufacture of the gassing element according to FIG. 5.

Figure 6:
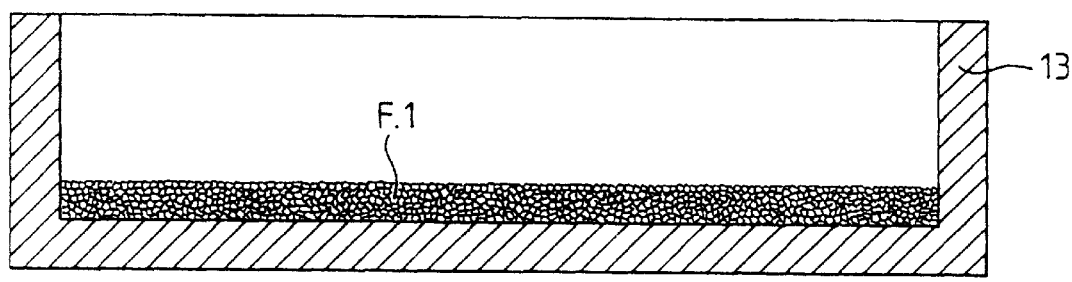
FIGS. 6 to 10 are sectional views showing successive phases of the production of the gassing element of FIG. 5.
Figure 7:
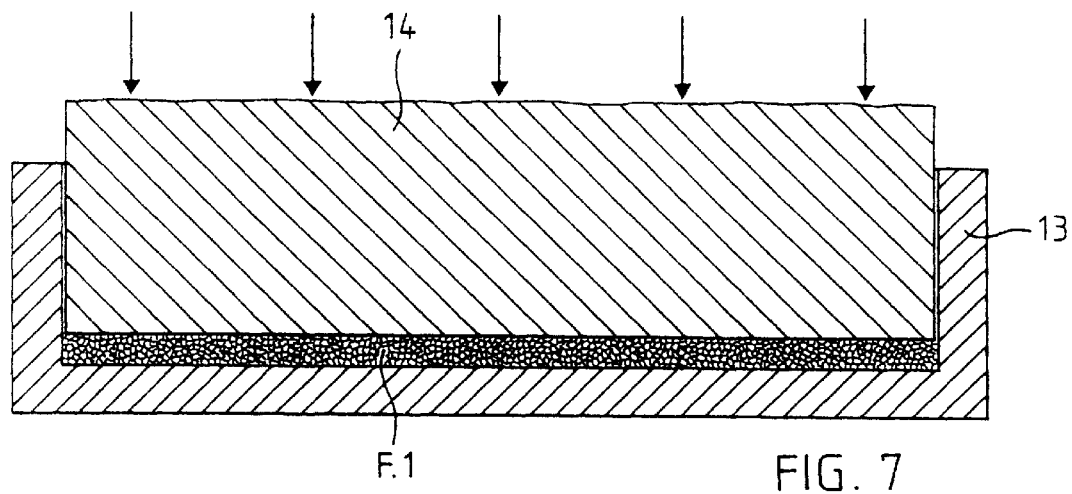

FIG. 6 shows a mold part 13, whose planar inner bottom surface has a shape corresponding to the flat shape of the gassing element to be produced. The mold part is made from a material to which the plastic to be used does not adhere or which has been treated to ensure such a non-adhesion. For the production of the finely porous surface layer 4 a mixture F.1 is filled into said mold part 13, said mixture comprising particles and uncured plastic. The mixture F.1 is vibrated in the mold and/or pressed or compacted with a first punch 14, as shown in FIG. 7.

Figure 8:
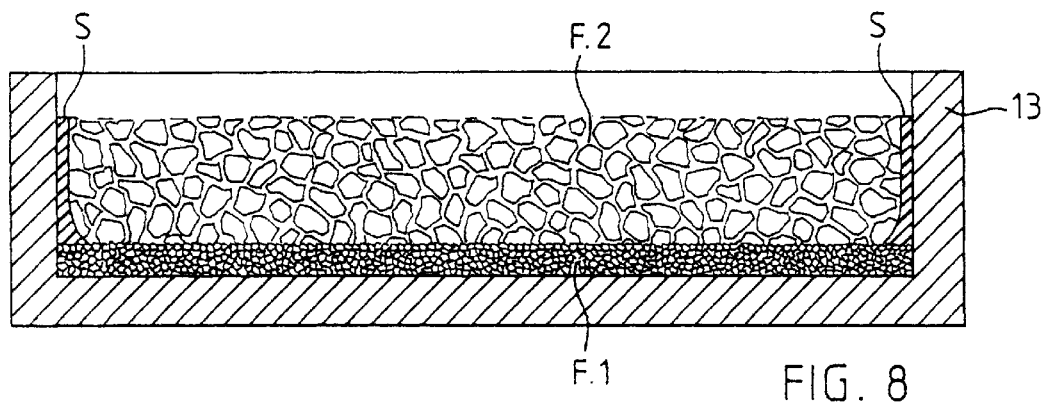

Then, as shown in FIG. 8, on the vibrated and/or compacted layer of first particles/plastic mixture F.1 along the wall of the mold part 13 is applied plastics material S without particles (optionally e.g. with glass fibers as the filling or reinforcing material). To enable this application to be easily performed, it is advantageous for the uncured plastics material S to be pasty or thixotropic. Then, on the first mixture F.1 for the surface layer 4 is applied a second particle/plastics mixture F.2 with larger particles for the flat shaped part. The two mixtures F.1 and F.2 more particularly differ through the smaller particles In the mixture F.1 and the larger particles in the mixture F.2.

Figure 9:
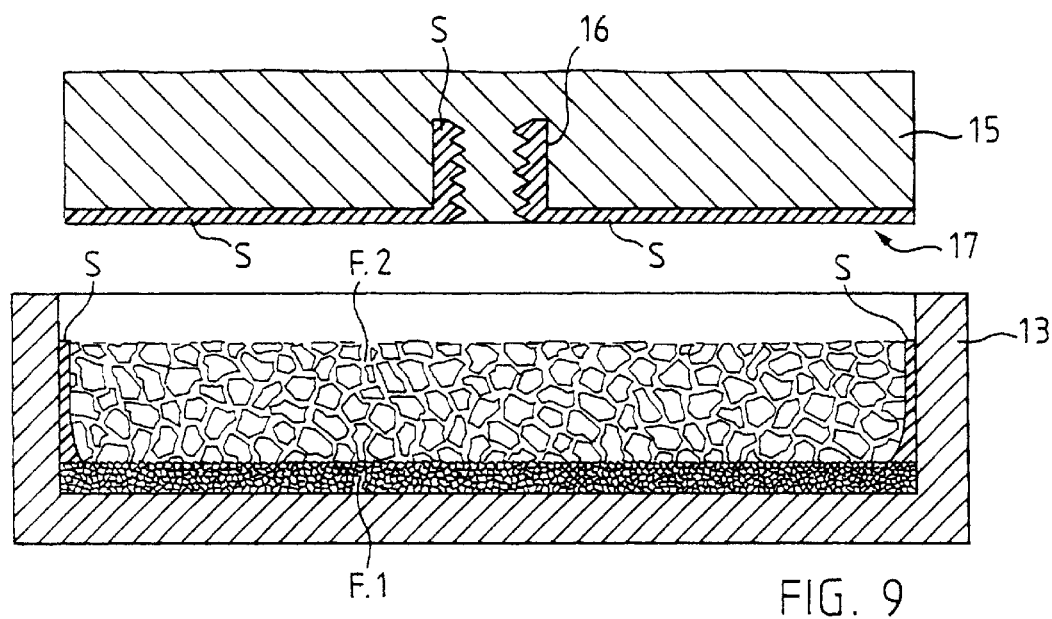

The mold part 13 is closed with a second punch 15, which has as the negative mold for the duct connection means recesses 16 (FIG. 9). These recesses 16 are filled with plastics material S without particles and the end face 17 of the punch 15 facing the mold part 13 is covered with a layer of the plastics material S, with the exception of the potential duct connection opening. By means of the second punch 15 the shaped part 3 and surface layer 4 are pressed together (FIG. 10), the compacting pressure being no higher than in the case of compaction with the first punch 14. Simultaneously heat is supplied if it is necessary for the curing of the plastic. Prior to or during compaction, the material in the mold can also be vibrated.

Figure 10:
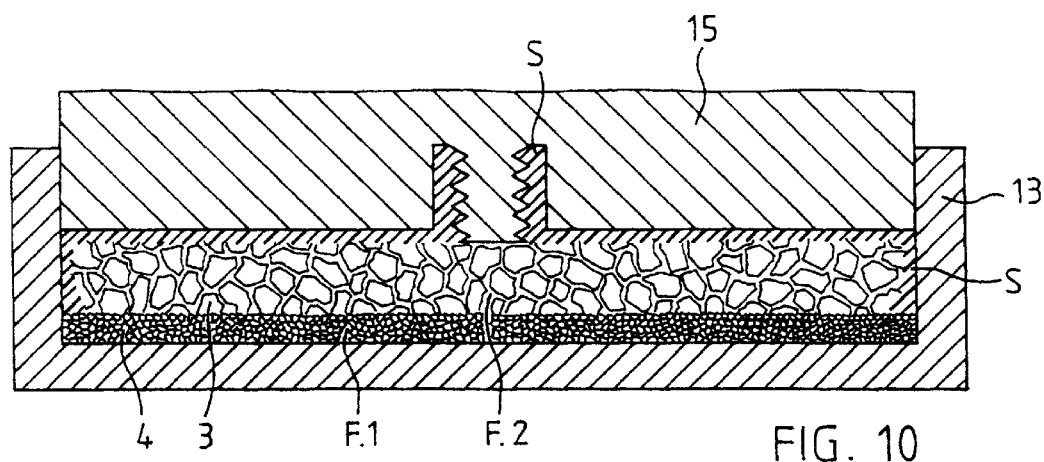

As a result of the compaction and vibration the plastics fractions of the different layers are combined leading to the substantially one-piece gassing element, which is shown in FIG. 10 (still in the mold). The punch 15 and mold part 13 are then removed from the gassing element (punch 15 by unscrewing). The gassing element is then complete and immediately ready for use.

For the manufacture of gassing elements with a coarsely porous shaped part and several finely porous layers the described method should be correspondingly used. For different shapes of duct connection means (e.g. for bayonet closure, snap hinge closure, etc.), the second punch 15 is to be given a corresponding multipart design. Obviously the moldings for the connection means can also be provided in the mold part 13 instead of in the punch and the gassing element is then made in the reverse order. However, this makes it necessary for the compaction of the surface layer 4 to use an at most equally high compacting pressure to that required for the compacting of the shaped part 3. Other conceivable method variants consist of producing the shaped part and the surface layer in two corresponding mold parts, which are then applied to one another for compaction and curing.

Figure 11:
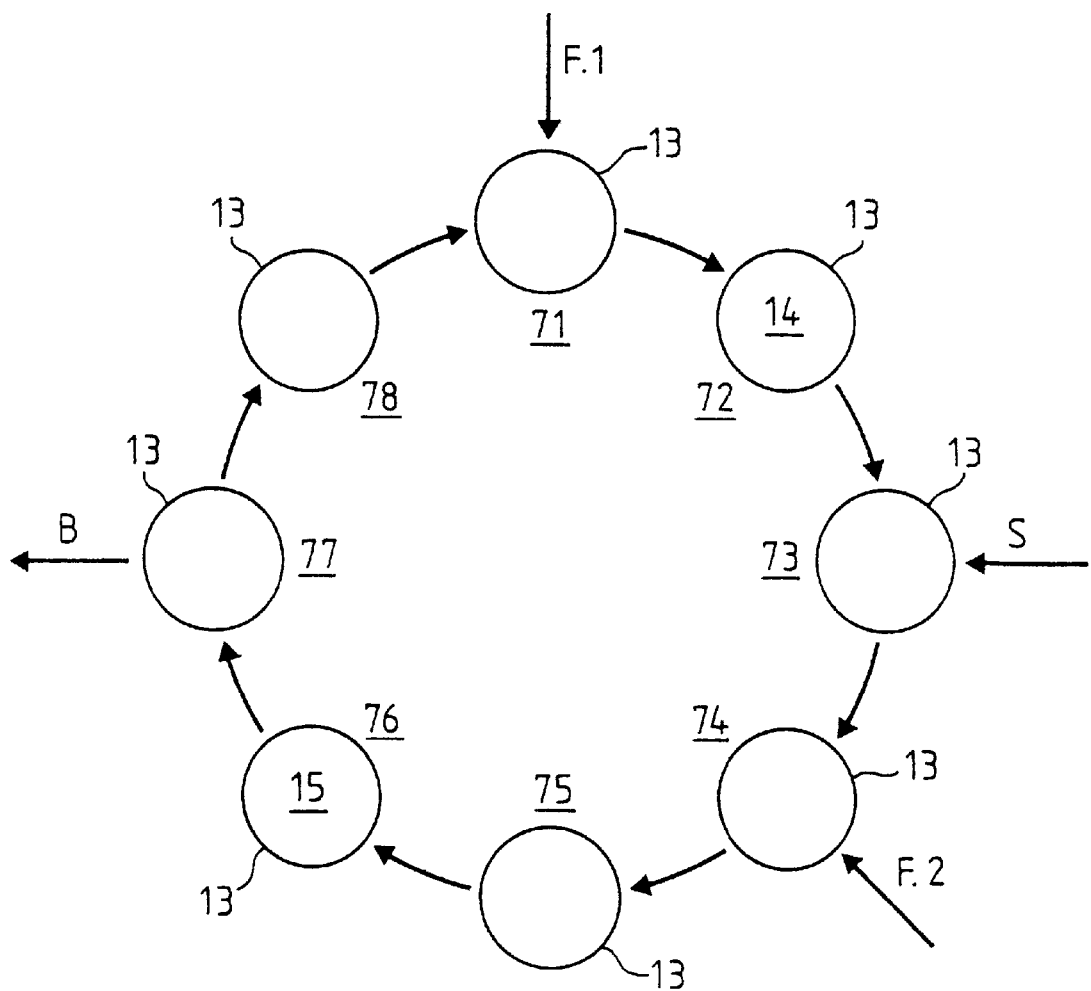
FIG. 11 is a schematic diagram of a circular process for the production of gassing elements according to FIG. 5.

FIG. 11 shows an circular process with which it is possible to manufacture in a continuous manner the gassing element according to FIG. 5 using a manufacturing method according to FIGS. 6 to 10. It is a closed conveying path on which eight mold parts 13 are moved in the arrow direction and in timed or cyclic manner through eight positions 71 to 78. The manufacturing method begins in the position 71 in which the first particle/plastic mixture F.1 is fed into the mold part 13. In the position 72 in which the first punch 14 is movably positioned perpendicular to the conveying direction of the mold parts 13, the first mixture is compacted in the mold part using the punch 14 and optionally vibrated, after which the punch is removed. In position 73 the plastics material S without particles is applied to the walls of the mold part. In the position 74 the second particle/plastics mixture F.2 is introduced into the mold part. In the position 76, where the second punch 15 is movably positioned perpendicular to the conveying direction of the mold parts 13, it is provided with plastics material S without particles, compacted in the mold part and removed again after curing the plastic. Optionally heat is supplied for curing purposes. In position 77 the mold part and content are cooled and the finished gassing element B is ejected from the mold part and in position 78 the mold part is cleaned and optionally treated with an agent for preventing sticking of the plastic.

In order to minimize the cycle time of a circular process of the type diagrammatically shown in FIG. 11, it is advantageous if the gassing elements in the mold part 13 are only cured to a state in which they are sufficiently firm for ejection from the mold part. A final or definitive curing stage can then be performed in batch form outside the continuous circular process.

As a more specific example for the gassing element according to the invention and the manufacture thereof, hereinafter are listed the necessary data leading to a gassing element, which in a clarification tank approximately 2 to 3 m below the water surface and With an available air overpressure of 0.1 bar and a very good service life, gives a better-than-average gassing action.

Gassing Element:

shape: round, diameter 210 mm thickness of surface layer 4 6 mm thickness of shaped part 3 11 mm thickness of closing layer 0.5 mm plastic: epoxy resin air permeability at 0.6 bar differential pressure: 6.6 liter per min and $cm^2$.

Materials:

first particle/plastic mixture F.1: 332 g particles (AlSi, screen fraction approx. 100μ), 83 g particles (AlSi, screen fraction 63 μm), 84 g epoxy resin, 12 g hardener, mixing time 15 min;

second particle/plastic mixture F.2: 622 g particles (Al, screen fraction 0.5 to 1.25 mm), 36 g epoxy resin, 9 g hardener, mixing time 5 min;

plastics material S without particles: 80 g epoxy resin, 20 g hardener, approx. 3 g thickening material (e.g. Aerosil), approx. 5 g short-cut glass fibers (approx. 3 mm), approx. 3 g. pigment.

Parameters for the Manufacturing Method:

treatment of the surface layer 4: precompress, then compact with compacting pressure of approx. 120 $kp/cm^2$, compacting time 5 to 10 sec, treatment of the mold part: compaction with compacting pressure of approx. 1 $kp/cm^2$, curing the gassing element under a compacting pressure of approx. 1 $kp/cm^2$ at 80° C. for 3 h.

What is claimed is:

1. A method for manufacturing a device for conducting fluid between a duct and a space comprising the steps of p1 providing first and second mating mold parts, placing in the first mold part a first mixture of curable plastic and first particles of a selected size and forming a layer from the mixture using the first and second mold parts, compacting the layer under a first compacting pressure and removing the second mold part, providing a third mold part having molding cavities for a duct connector and matable with the first mold part, covering the layer in the first mold part with a second mixture of curable plastic and second particles larger than the first particles, with the first and third mold parts, compacting the second mixture with a second compacting pressure lower than the first compacting pressure, curing the plastic, filling the duct connector molding cavities and coating an inner surface of the third mold part, and portions of the first mold part not covered by the layer, with curable plastic, and joining the first and third mold parts and curing the plastic to form a one-piece device.

2. A method according to claim 1 wherein at least one of the steps of compacting the first and second mixtures includes compacting with a combination of vibration and compacting pressure.

3. A method according to claim 1 wherein the first compacting pressure is about 120 kp/cm$^2$ and said second compacting pressure is about 1 kp/cm$^2$.

4. A method according to claim 1 wherein the step of compacting the layer includes tightly covering the layer with a film and producing a vacuum between the film and the first mold part to compact the layer.

5. A method according to claim 1 wherein the mixtures of particles and curable plastic are produced using a mixing and kneading action.

* * * * *